United States Patent
Ma

(10) Patent No.: US 12,501,984 B2
(45) Date of Patent: *Dec. 23, 2025

(54) ARTIFICIAL NAIL TIP AND CURING COMPOSITION SET AND APPLYING METHOD THEREOF

(71) Applicant: APPLIED LACQUER INDUSTRIES INC., City of Industry, CA (US)

(72) Inventor: Carol Ma, Hacienda Heights, CA (US)

(73) Assignee: APPLIED LACQUER INDUSTRIES INC., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,307

(22) Filed: Feb. 27, 2023

(65) Prior Publication Data

US 2023/0218059 A1    Jul. 13, 2023

Related U.S. Application Data

(63) Continuation-in-part of application No. 17/358,740, filed on Jun. 25, 2021, now Pat. No. 11,793,289, which is a continuation-in-part of application No. 16/299,103, filed on Mar. 11, 2019, now Pat. No. 11,224,276, which is a continuation of application No. 15/916,216, filed on Mar. 8, 2018, now Pat. No. 11,304,492.

(51) Int. Cl.
| | |
|---|---|
| *A45D 31/00* | (2006.01) |
| *A45D 29/04* | (2006.01) |
| *A45D 29/12* | (2006.01) |
| *A45D 29/18* | (2006.01) |
| *C09D 175/16* | (2006.01) |
| *C09J 175/14* | (2006.01) |

(52) U.S. Cl.
CPC ............ *A45D 31/00* (2013.01); *A45D 29/18* (2013.01); *C09D 175/16* (2013.01); *C09J 175/14* (2013.01); *A45D 29/04* (2013.01); *A45D 29/12* (2013.01); *A45D 2200/205* (2013.01); *A45D 2200/25* (2013.01)

(58) Field of Classification Search
None
See application file for complete search history.

(56) References Cited

U.S. PATENT DOCUMENTS

2015/0224045 A1* 8/2015 Doan ................... A61K 8/87
132/200

\* cited by examiner

*Primary Examiner* — Nicole P Babson
(74) *Attorney, Agent, or Firm* — Pillsbury Winthrop Shaw Pittman LLP

(57) ABSTRACT

A nail tip curing composition includes an Extend Gel, an edge-off flat brush, a nail filing device, a plurality of GEL-X tips, a pH Bonder, and a Non-Acidic Gel Primer. The pH Bonder forms a pH Bonder layer on a surface of a fingernail. The Non-Acidic Gel Primer forms a Non-Acidic Gel Prime layer overlapped on the pH Bonder layer. The Extend Gel forms an Extend Gel layer overlapped on the Non-Acidic Gel Prime layer. The GEL-X tip is filed by the nail filing device and the Extend Gel is applied on an underside contact surface of the Gel-X tip by the edge-off flat brush. The underside contact surface of the Gel-X tip is contacted with the Extend Gel layer on the fingernail in such a manner that the Gel-X tip is firmly affixed on the fingernail.

20 Claims, 9 Drawing Sheets

| Extend Gel 10 | | |
|---|---|---|
| CHEMICAL NAME | CAS NUMBER | WT/WT % |
| Polyurethane Acrylate Oligomer 11 | NA | 60.0-80.0% |
| 2-Hydroxyethyl methacrylate 12 | 868-77-9 | 10.0-15.0% |
| 1-Hydroxycyclohexyl phenyl ketone 13 | 947-19-3 | 1.0-5.0% |
| Phenylbis(2,4,6-trimethylbenzoyl)phosphine oxide 14 | 162881-26-7 | 1.0-5.0% |

FIG.12

| MSDS top gel coat 70 | | | |
|---|---|---|---|
| CHEMICAL NAME | CAS # | EINECS # | % |
| Polyurethane Acrylate Oligomers 71 | Exempt | N/A | 60.0-80.0% |
| 2-Hydroxyethyl methacrylate (HEMA) 72 | 868-77-9 | N/A | 10.0-15.0% |
| Di(trimethylolpropane) tetraacrylate 73 | 94108-97-1 | N/A | 1.0-5.0% |
| Pentaerythritol tetrakis(3-mercaptopropionate) (PETMP) 74 | 7575-23-7 | N/A | 1.0-5.0% |
| Polyether-Modified Polysiloxane 75 | 157479-55-5 | N/A | 0.0-1.0% |

FIG. 13

ARTIFICIAL NAIL TIP AND CURING COMPOSITION SET AND APPLYING METHOD THEREOF

CROSS REFERENCE OF RELATED APPLICATION

This application is a Continuation-In-Part application that claims the benefit of priority under 35 U.S.C. § 120 to a non-provisional application, application Ser. No. 17/358,740, filed Jun. 25, 2021, issued as U.S. Pat. No. 12,016,232, which is a Continuation-In-Part application that claims the benefit of priority under 35U.S.C. § 120 to a non-provisional application, application Ser. No. 16/299,103, filed Mar. 11, 2019, issued as U.S. Pat. No. 11,224,276, which is a Continuation application that claims the benefit of priority under 35U.S.C. § 120 to a non-provisional application, application Ser. No. 15/916,216, filed Mar. 8, 2018, issued as U.S. Pat. No. 11,304,492.

BACKGROUND OF THE PRESENT INVENTION

Field of Invention

The present invention relates to a nail tip composition, and more particularly to a set of artificial nail tip and curing composition set and applying method thereof, which not only can reduce the curing and hardening time of the artificial nail tip on the fingernail but also can prevent unnecessary damages to fingernails.

Description of Related Arts

Gel nail art is a decorate beautification work of nails, which is considered as an art design nowadays. The gel nail art has the characteristics of the diversification of various forms. According to the hand shape, the finger nail shape, the color of the skin, clothing and other requirements, the gel nail art is a process of nail disinfection, cleaning, care, maintenance, and decorate beautification. Currently, during the gel nail process, phototherapy is used for accelerated weathering. Some people used to do a hand care at first before using the phototherapy manicures. However, exfoliator results in thinning of the skin, which further cause skin aging if the fingernail is directly exposed under the phototherapy lamp such as UV or blue light without sunscreen. The improper gel nail art may cause nail damage, which even causes separation of the nail and the nail bed under the nails and eventually leads to shorter nail bed. Therefore, healthy nail composition as well as the right nail tools are required.

SUMMARY OF THE PRESENT INVENTION

The invention is advantageous in that it provides an artificial nail tip and curing composition set and applying method thereof, which not only decorates fingernails but also protects the fingernails.

Another advantage of the invention is to provide an artificial nail tip and curing composition set and applying method thereof, which not only can reduce the curing and hardening time of the artificial nail tip on the fingernail but also can prevent unnecessary damages to fingernails.

Another advantage of the invention is to provide an artificial nail tip and curing composition set and applying method thereof, which includes an Extend Gel for firmly affixing the artificial nail tips, namely GEL-X tips, to the surface of the fingernails.

Another advantage of the invention is to provide an artificial nail tip and curing composition set and applying method thereof, which protects the fingernails and reduces the UV damage.

Additional advantages and features of the invention will become apparent from the description which follows, and may be realized by means of the instrumentalities and combinations particular point out in the appended claims.

According to the present invention, the foregoing and other objects and advantages are attained by an artificial nail tip and curing composition set, comprising:

at least an artificial nail tip, namely GEL-X tip, an Extended Gel, an edge-off flat brush, a nail filing device, a pH Bonder, and a Non-Acidic Gel Primer, wherein the pH Bonder forms a pH Bonder layer on a surface of a fingernail, wherein the Non-Acidic Gel Primer forms a Non-Acidic Gel Prime layer overlapped on the pH Bonder layer, wherein the Extend Gel forms a Extend Gel layer overlapped on the Non-Acidic Gel Prime layer, wherein an underside contact surface of the GEL-X tip is filed by the nail filing device to provide a rough affixing surface and the Extend Gel is applied on an underside contact surface of the Gel-X tip by the edge-off flat brush until at least the rough affixing surface is completely covered with the Extend Gel to form an adhering layer, wherein the underside contact surface of the Gel-X tip is contacted with the Extend Gel layer on the fingernail in such a manner that the Gel-X tip is firmly affixed on the fingernail.

According to the present invention, the foregoing and other objects and advantages are also attained by an applying method of a nail tip composition, comprising the steps of:

(a) forming a PH Bonder layer on a surface of a fingernail by applying a pH Bonder to the fingernail;

(b) forming a Non-Acidic Gel Primer layer overlapped on the pH Bonder layer by applying a Non-Acidic Gel Primer to the fingernail;

(c) forming an Extend Gel layer overlapped on the Non-Acidic Gel Primer layer using an edge-off flat brush by applying a layer of the Extend Gel to the fingernail;

(d) providing a rough affixing surface on an underside contact surface of the Gel-X tip, wherein the step (d) can be applied before the step (a);

(e) applying the Extend Gel to the underside contact surface of the Gel-X tip to form an Extend Gel tip layer, for example using an edge-off flat brush;

(f) pressing the Gel-X tip onto the fingernail gradually from base to tip thereof to prevent air bubbles and to ensure a tight seal; and (g) pressing down on the Gel-X tip and the fingernail by an external force until the Extend Gel tip layer on the rough affixing surface 411 is cured and hardened with the Extend Gel layer on the fingernail 90, such that the Gel-X tip is firmly attached to the fingernail.

In one embodiment, the step (d) can be accomplished by filing the underside contact surface of the Gel-X tip by a nail filing device.

In one embodiment, the step (g) can be executed under exposure to UV or LED lighting for at least two minutes for curing and hardening.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 12 is a table illustrating the chemical compositions of the Extend Gel of the nail tip curing composition according to the above preferred embodiment of the present invention.

FIG. 13 is a table illustrating the chemical compositions of the MSDS top gel coat of the nail tip curing composition according to the above preferred embodiment of the present invention.

Figure 1:
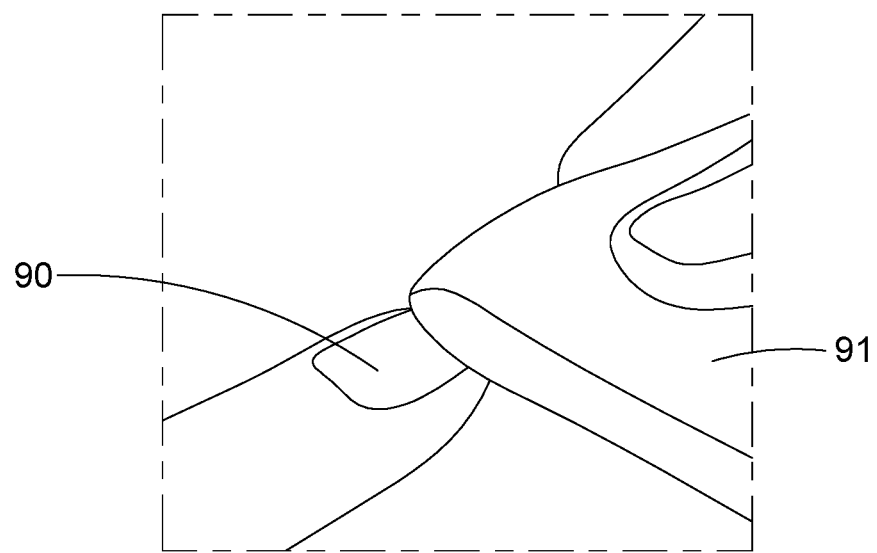
FIG. 1 is a schematic view illustrating an applying method of an artificial nail tip and curing composition set according to a preferred embodiment of the present invention.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 9:
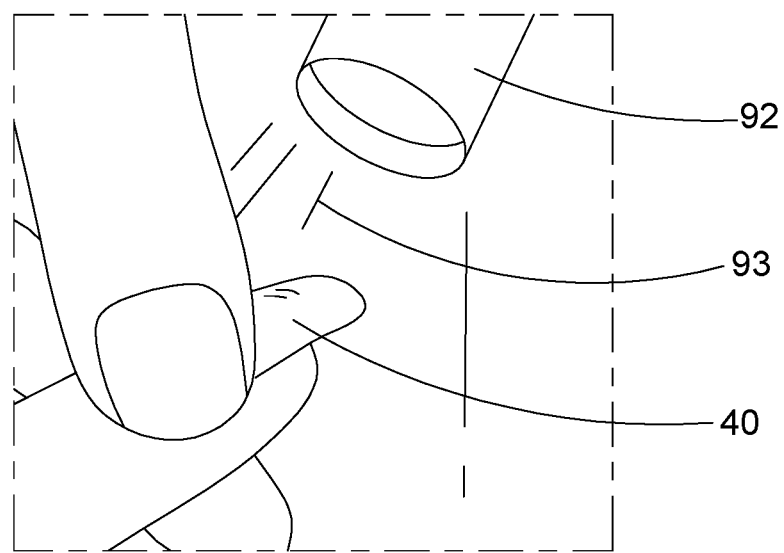
FIG. 9 is a schematic view illustrating the applying method of the artificial nail tip and curing composition set according to the above preferred embodiment of the present invention.
Figure 10:
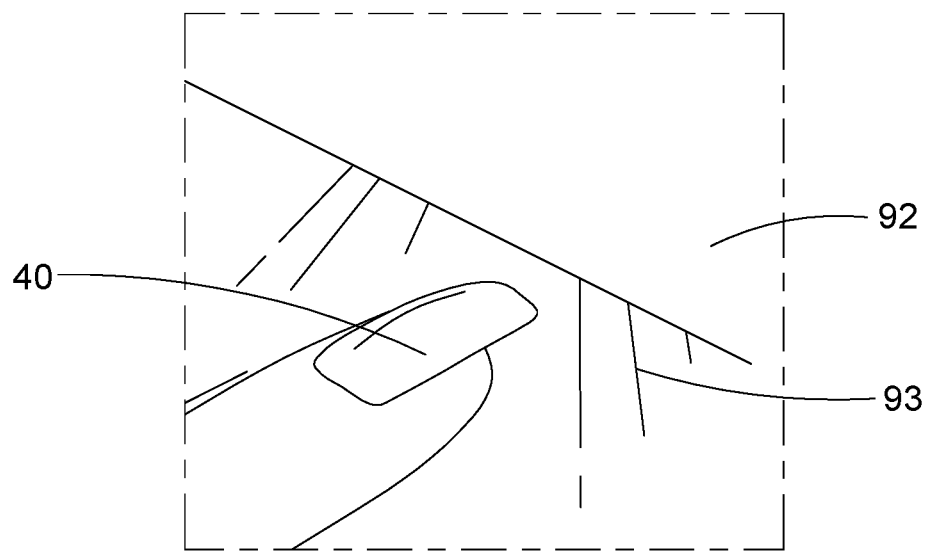
FIG. 10 is a schematic view illustrating the applying method of the artificial nail tip and curing composition set according to the above preferred embodiment of the present invention.
Figure 11:
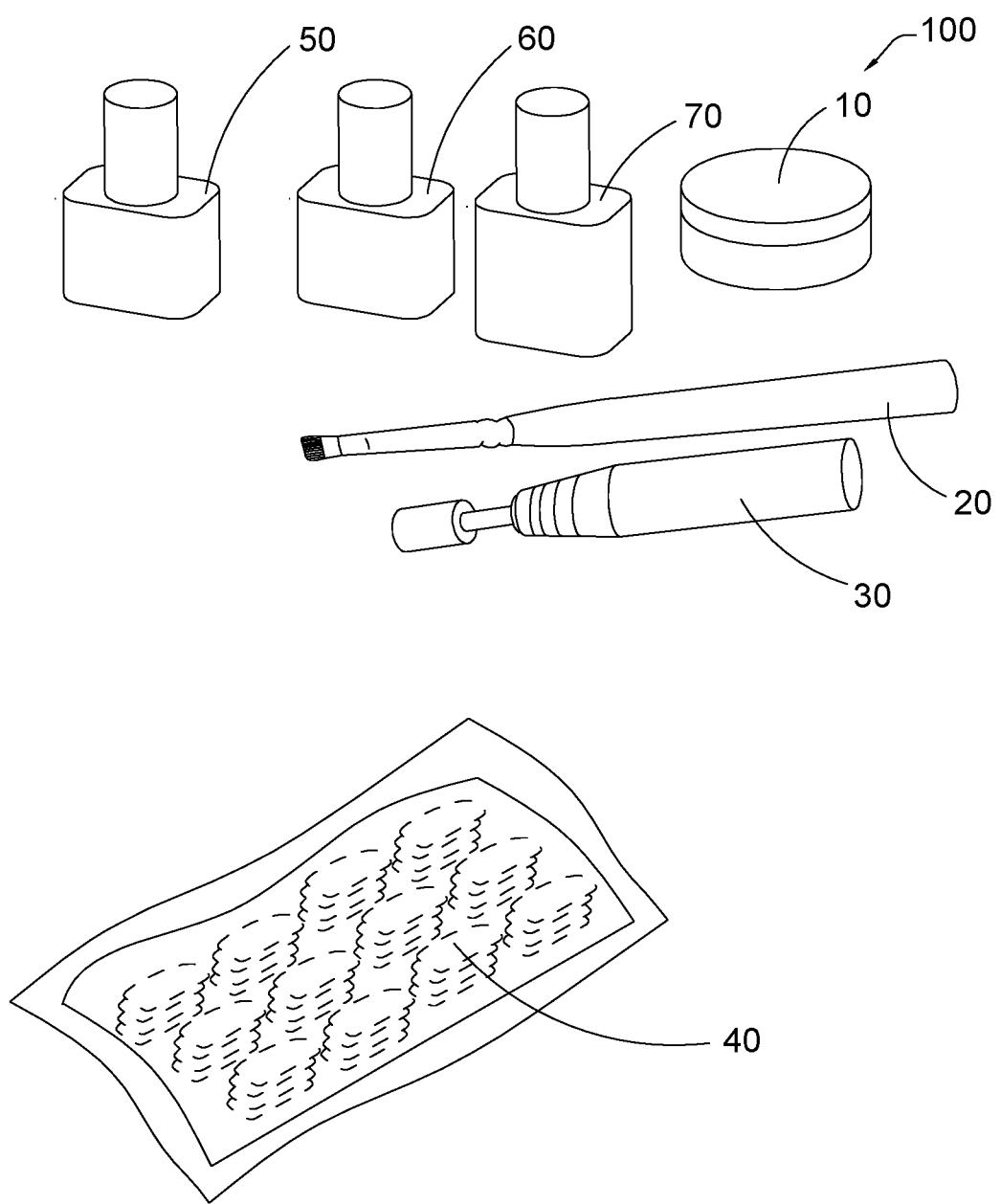
FIG. 11 is a perspective view illustrating the nail tip curing composition set according to the above preferred embodiment of the present invention.

Referring to FIG. 1 to FIG. 11 of the drawings, an artificial nail tip and curing composition set 100 according to a preferred embodiment is illustrated, wherein the nail tip curing composition set 100 comprises an Extend Gel 10, an edge-off flat brush 20, a nail filing device 30, a plurality of artificial nail tips 40 embodied and named as GEL-X tips, a pH Bonder 50, and a Non-Acidic Gel Primer 60, as shown in FIG. 11. The Extend Gel 10 is an adhesive composition used as GEL-X tips adhesive.

As shown in FIG. 1 of the drawings, before using the nail tip curing composition set 100, a fingernail 90 is wiped to be cleaned by a cotton pad 91 soaked with rubbing alcohol, so that the fingernail 90 is cleaned to remove oil and dust thereon.

Figure 2:
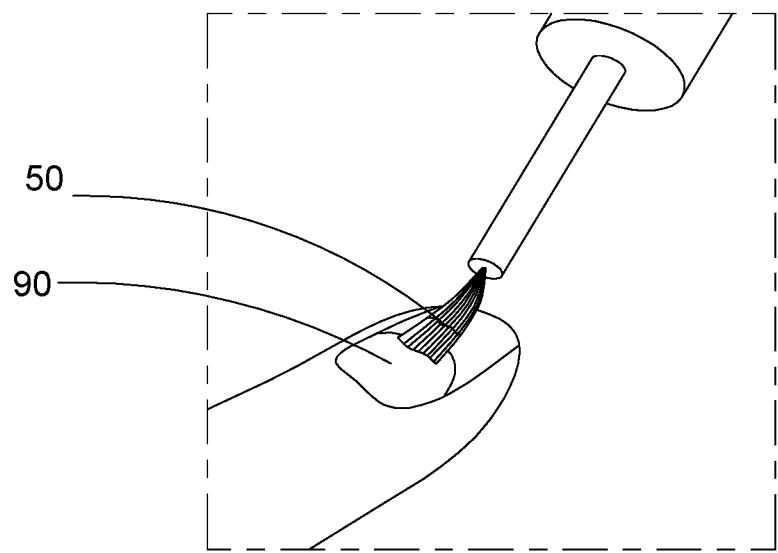
FIG. 2 is a schematic view illustrating the applying method of the artificial nail tip and curing composition set according to the above preferred embodiment of the present invention.
Figure 3:
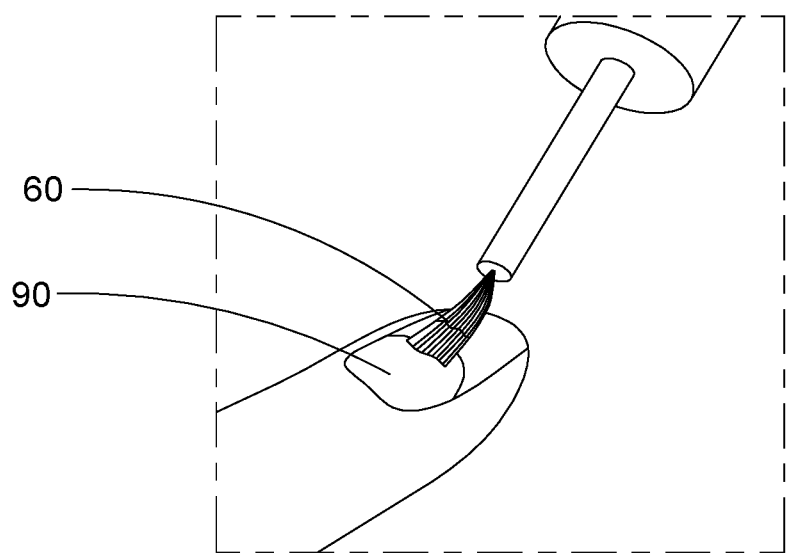
FIG. 3 is a schematic view illustrating the applying method of the artificial nail tip and curing composition set according to the above preferred embodiment of the present invention.
Figure 4:
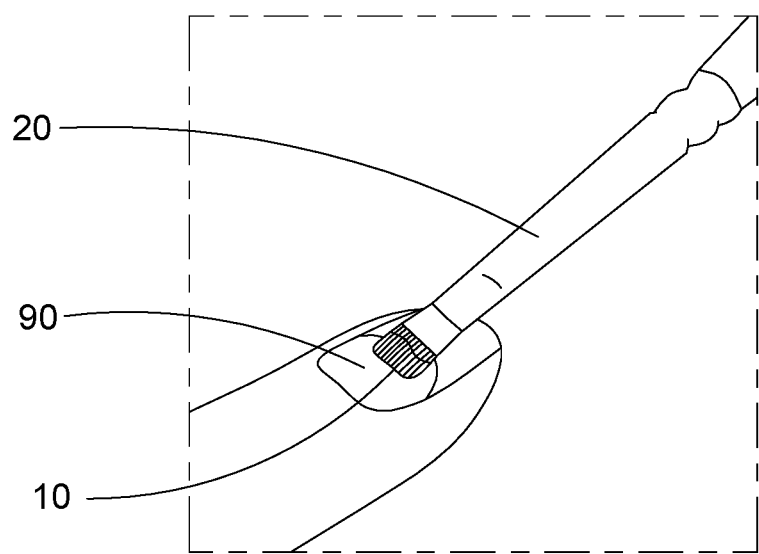
FIG. 4 is a schematic view illustrating the applying method of the artificial nail tip and curing composition set according to the above preferred embodiment of the present invention.

As shown in FIG. 2 of the drawings, the pH Bonder 50 is applied on the fingernail 90 to form a pH Bonder layer on the surface of the fingernail 90. When the pH Bonder layer applied on the fingernail 90 is aired rapidly, the Non-Acidic Gel Primer 60 is applied on the fingernail 90. Specifically, as shown in FIG. 3 of the drawings, the Non-Acidic Gel Primer 60 is applied on the fingernail 90 to form a Non-Acidic Gel Prime layer on the surface of the fingernail 90, which is overlapped on the pH Bonder layer. When the Non-Acidic Gel Prime layer applied on the fingernail 90 is aired rapidly, the edge-off flat brush 20 is used to apply a thin layer of the Extend Gel 10 to the fingernail 90. Specifically, as shown in FIG. 4 of the drawings, the thin layer of the Extend Gel 10 is applied on the fingernail 90 to form an Extend Gel layer overlapped on the Non-Acidic Gel Prime layer.

Figure 5:
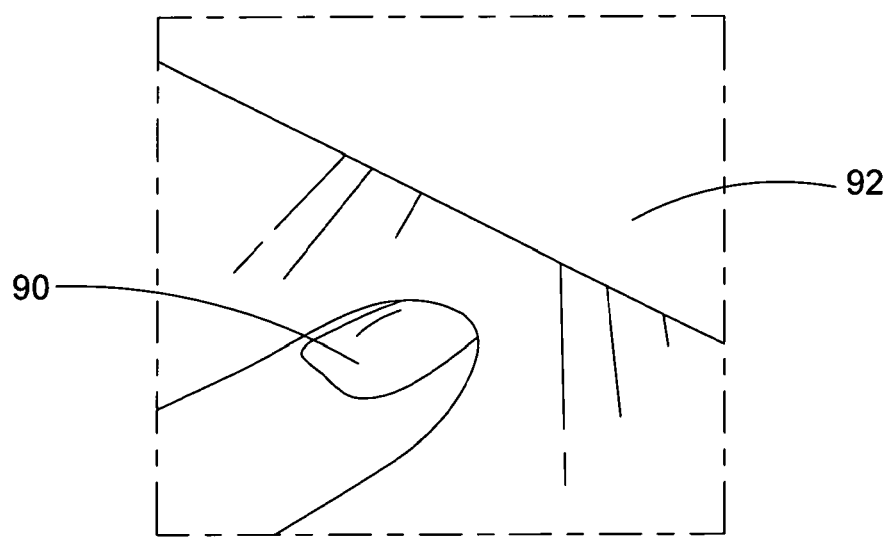
FIG. 5 is a schematic view illustrating the applying method of the artificial nail tip and curing composition set according to the above preferred embodiment of the present invention.

As shown in FIG. 5 of the drawings, according to the preferred embodiment of the present invention, the Extend Gel layer formed by the Extend Gel 10 and overlapped on the Non-Acidic Gel Prime layer on the fingernail 90 is cured with a LED lamp 92 for a period of time, such as about 30 seconds. Alternatively, the Extend Gel layer formed by the Extend Gel 10 and overlapped on the Non-Acidic Gel Prime layer on the fingernail 90 can also be cured with UV lamp for a period of time, such as about 2 minutes.

Regarding to the artificial nail tips, namely Gel-X tips 40, made of for example acrylic material, are used as the artificial nail tips according to the preferred embodiment of the present invention. Before attaching the Gel-X tips 40 on the fingernails, a rough affixing surface 411 is provided on an underside contact surface 41 of each Gel-X tip, which is the lower inner portion of the Gel-X tip having a surface area approximately equal to the surface area of the fingernail that the Gel-X tip is going to in contact with and affixing thereon. The rough affixing surface 411 can be made when it is manufacturing to provide a coarse surface other than the generally smooth surface required on the underside surface and topside surface of the finger nail. On the rough affixing surface 411, multiple indented grooves 412 are formed.

Figure 6:
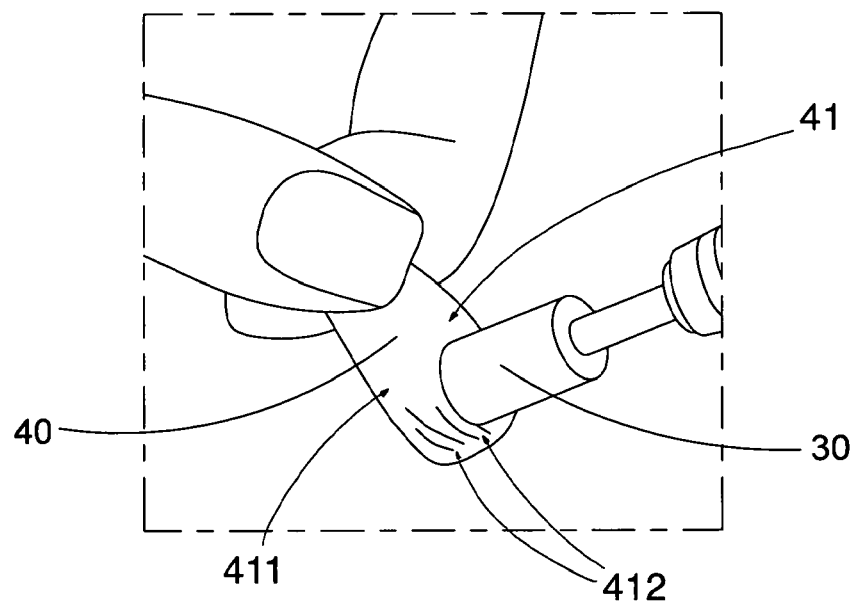
FIG. 6 is a schematic view illustrating the applying method of the artificial nail tip and curing composition set according to the above preferred embodiment of the present invention.

According to the preferred embodiment, the rough affixing surface 411 is provided by means of the nail filing device 30. The underside contact surface 41 is filed by the nail filing device 30 to form the rough affixing surface 411 having multiple small indented grooves 412 thereon, as shown in FIG. 6. It is appreciated that a health fingernail will generally have a smooth surface. In order to enhance the affixing of the artificial nail tip on the fingernail surface, the conventional way to slightly file the fingernail surface and then apply the glue thereon for adhering the artificial nail tip on the fingernail. To prevent causing unnecessary damages to the fingernail, the formation and providing of the rough affixing surface 411 on the underside contact surface 41 of the Gel-X tip 40 is essential for affixing the Gel-X tips 40 to the fingernails according to the preferred embodiment of the present invention.

In other words, starting from a base portion of the underside contact surface 41 of the Gel-X tip, generally half of the underside contact surface 41 is filed to form the rough affixing surface 411. The rough affixing surface 411, especially the presence of the multiple indented grooves 412 formed thereon making the surface 411 a coarse surface, greatly increases the contacting surface area of the rough affixing surface 411 to pick up the Extend Gel 10. Therefore, when the Gel-X tip adhesive, i.e. the Extend Gel 10, can be retained to the rough affixing surface 411 of each of the Gel-X tips 40 than a smooth surface having the same size.

Figure 7:
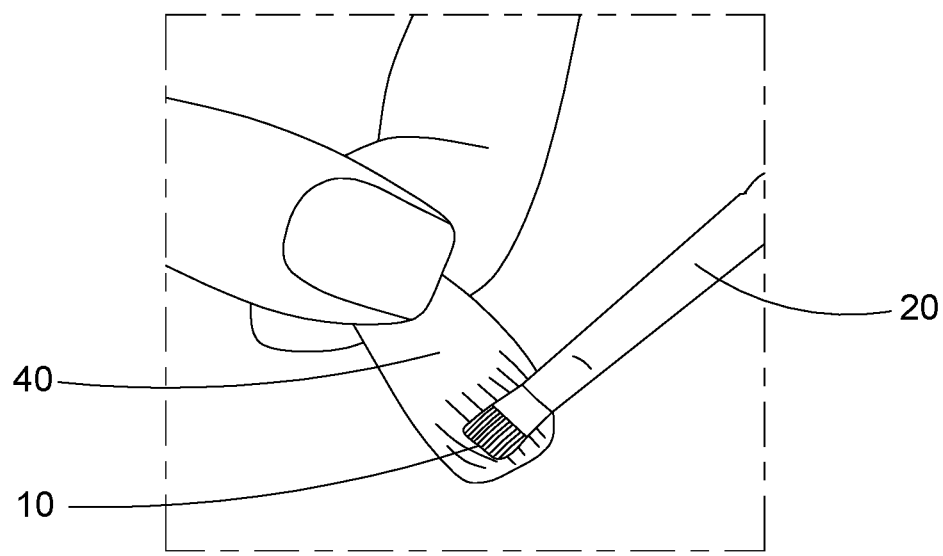
FIG. 7 is a schematic view illustrating the applying method of the artificial nail tip and curing composition set according to the above preferred embodiment of the present invention.

As shown in FIG. 7 of the drawings, a small drop of the Extend Gel 10, which is enough to cover the natural fingernail, is applied to a base portion of the rough affixing surface 411 of the underside contact surface 41 of Gel-X nail tip 40 by the edge-off flat brush 20, generally about ⅓ of the surface area of the natural fingernail, to form an Extend Gel tip layer on the rough affixing surface 411 of the Gel-X tip 40. The Extend Gel 10 will flow into the multiple indented grooves 412 and be retained therein. In other words, the multiple indented grooves 412 of the rough affixing surface 411 can retain more Extend Gel 10. Therefore, when the rough affixing surface 411 is in contact with the fingernail surface, the Extend Gel layer will attach and affix the Gel-X tip 40 onto the fingernail 90, wherein the retaining of the Extend Gel 10 in the multiple indented grooves 412 substantially increases the thickness of the Extend Gel 10 between the Gel-X tip 40 and the fingernail 90 that effectively increases the adhering bonding of the Gel-X tip 40 and the fingernail 90 so as to more firmly affix the Gel-X top 40 with the fingernail 90 with less curing and hardening time.

Figure 8:
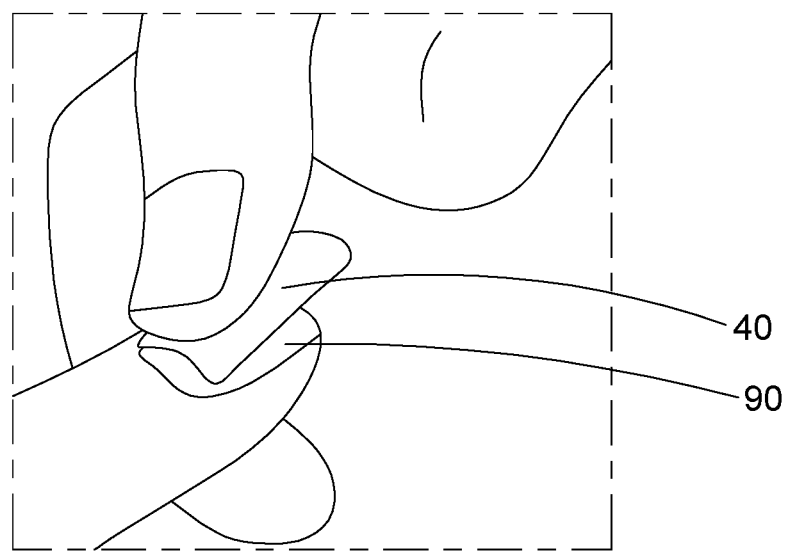
FIG. 8 is a schematic view illustrating the applying method of the artificial nail tip and curing composition set according to the above preferred embodiment of the present invention.

Referring to in FIG. 8 of the drawings, after the Extend Gel 10 is applied on the rough affixing surface 411 of the underside contact surface 41 of the Gel-X tip 40, the Gel-X nail tip 40 is pressed onto the fingernail 90 gradually from base to tip of the Gel-X nail tip 40 to prevent air bubbles or lifting and to ensure a tight seal.

As shown in FIG. 9 of the drawings, an external force is pressed down the Gel-X tip 40 and the fingernail 90, and then the fingernail 90 with the Gel-X tip 40 are cured with the LED lighting 93 of the LED lamp 92 for seconds such as about 10 seconds. The LED lamp 93, which can be a LED flashlight as shown in FIG. 9 or a bridge light for sitting on a table surface to define a receiving cavity between the LEDs provided on an underside of the bridge light and the table surface, so that fingernail 90 with the Gel-X tip 40 pressing down thereon can be placed within the receiving cavity and treated under the LED lighting 93. Eventually, the external force pressing down the Gel-X tip 40 and the fingernail 90 is removed and the LED lighting 93 from the LED lamp 92 is applied around the Gel-X tip 40 to ensure all sides of the Gel-X tip 40 being cured and hardened.

Then, as shown in FIG. 10 of the drawings, the entire fingernail 90 with the Gel-X tip 40 affixed thereon can be cured under the LED lamp 92 for a few seconds such as 30 seconds, until the Extend Gel tip layer on the rough affixing surface 411 of the underside contact surface 41 of the Gel-X tip 40 and the Extend Gel layer on the fingernail 90 are cured and hardened integrally to form a bonding Extend Gel layer between the Gel-X tip 40 and the fingernail 90. In maximum, application of about 2 minutes of LED lighting to affix the Gel-X tip 40 on the fingernail 90 could be more than enough. Alternatively, the entire fingernail 90 is cured by the UV lamp for a few minutes such as about 2 minutes.

It is worth mentioning that since the Extend Gel 10 of the Extend Gel tip layer is retained in the indented grooves 412 of the rough affixing surface 411 of the underside contact surface 41 of the Gel-X tip 40, the Extend Gel 10 retained in the indented grooves 412 can act like roots to hold the Gel-X tip 40 to the fingernail 90 that greatly enhances the bonding and adhering ability of the cured and hardened bonding Extend Gel layer between Gel-X tip 40 and the fingernail 90 while a relatively thin bonding Extend Gel layer is enough to affix the Gel-X tip 40 on the fingernail 90 firmly for a relatively longer lift span for at least couple weeks. Also, the thinner the bonding Extend Gel layer, the shorter the curing and hardening time by the LED lighting is required that can greatly shorten the total time required for affixing ten nail tips to ten fingernails of the user.

To detach the Gel-X tips 40 from the fingernails 90, the user may simply soaking the fingernail 90 with the Gel-X tip 40 thereon into an acetone for a period of time and the Gel-X tip 40 will separate from the fingernail 90.

It is worth mentioning that the Extend Gel 10 is used as a GEL-X tip adhesive. The chemical formulation of the Extend Gel 10 is based on aery 1 ate/methacrylate chemistry, and contains monofimctional and multifunctional aery 1 ate/methacrylate monomers/oligomers and photoinitiators. The Extend Gel 10 in the uncured state is a potential sensitizer, a primary eye irritant and a moderate skin irritant.

Specifically, as shown in FIG. 12 of the drawings, the chemical composition of the Extend Gel 10 includes a Polyurethane Acrylate Oligomer 11, a 2-Hydroxyethyl methacrylate 12, a 1-Hydroxycyclohexyl phenyl ketone 13 and a Phenylbis(2,4,6-trimethylbenzoyl)phosphine oxide 14.

More specifically, a basic proportion range of the Polyurethane Acrylate Oligomer 11 by weight is 60.0-80.0%, a basic proportion range of the 2-Hydroxyethyl methacrylate 12 by weight is 10.0-15.0%, a basic proportion range of the 1-Hydroxycyclohexyl phenyl ketone 13 by weight is 1.0-5.0%, and a basic proportion range of the Phenylbis(2,4,6-trimethylbenzoyl)phosphine oxide 14 by weight is 1.0-5.0%.

It is worth mentioning that the specific gravity of the Extend Gel 10 is E06-1.08 and the Vapor Pressure, (mm Hg) is C:<0.01.

As shown in FIG. 11 and FIG. 13 of the drawings, the nail tip composition kit 100 further comprises a MSDS top gel coat 70 applied on the fingernail 90.

Specifically, as shown in FIG. 13 of the drawings, the chemical composition of the MSDS top gel coat 70 is a top coat composition including a Polyurethane Acrylate Oligomers 71, a 2-Hydroxyethyl methacrylate (HEMA) 72, a Di(Trimethylolpropane) Tetraacrylate 73, a Pentaerythritol Tetra (3-mercaptopropionate) (PETMP) 74, and a Polyether-Modified Polysiloxane 75.

More specifically, a basic proportion range of the Polyurethane Acrylate Oligomers 71 by weight is 60.0-80.0%, a basic proportion range of the 2-Hydroxyethyl methacrylate (HEMA) 72 by weight is 10.0-15.0%, a basic proportion range of the Di(Trimethylolpropane) Tetraacrylate 73 by weight is 1.0-5.0%, a basic proportion range of the PETMP 74 by weight is 1.0-5.0%, and a basic proportion range of the Polyether-Modified Polysiloxane 75 is 0.0-1.0%.

It is worth mentioning that the boiling point of the MSDS top gel coat 70 is 212° F.

It is worth mentioning that the flash point (° F.) of the MSDS top gel coat 70 is 96° F.

It is worth mentioning that the specific gravity of the MSDS top gel coat 70 is 1.14.

It is worth mentioning that when users need to take off the GEL-X tips 40, they can either wrap in cotton soaked acetone in the foil or literally soak the fingernail 90 with the GEL-X tips 40 in a bowl of acetone.

Figure 14:
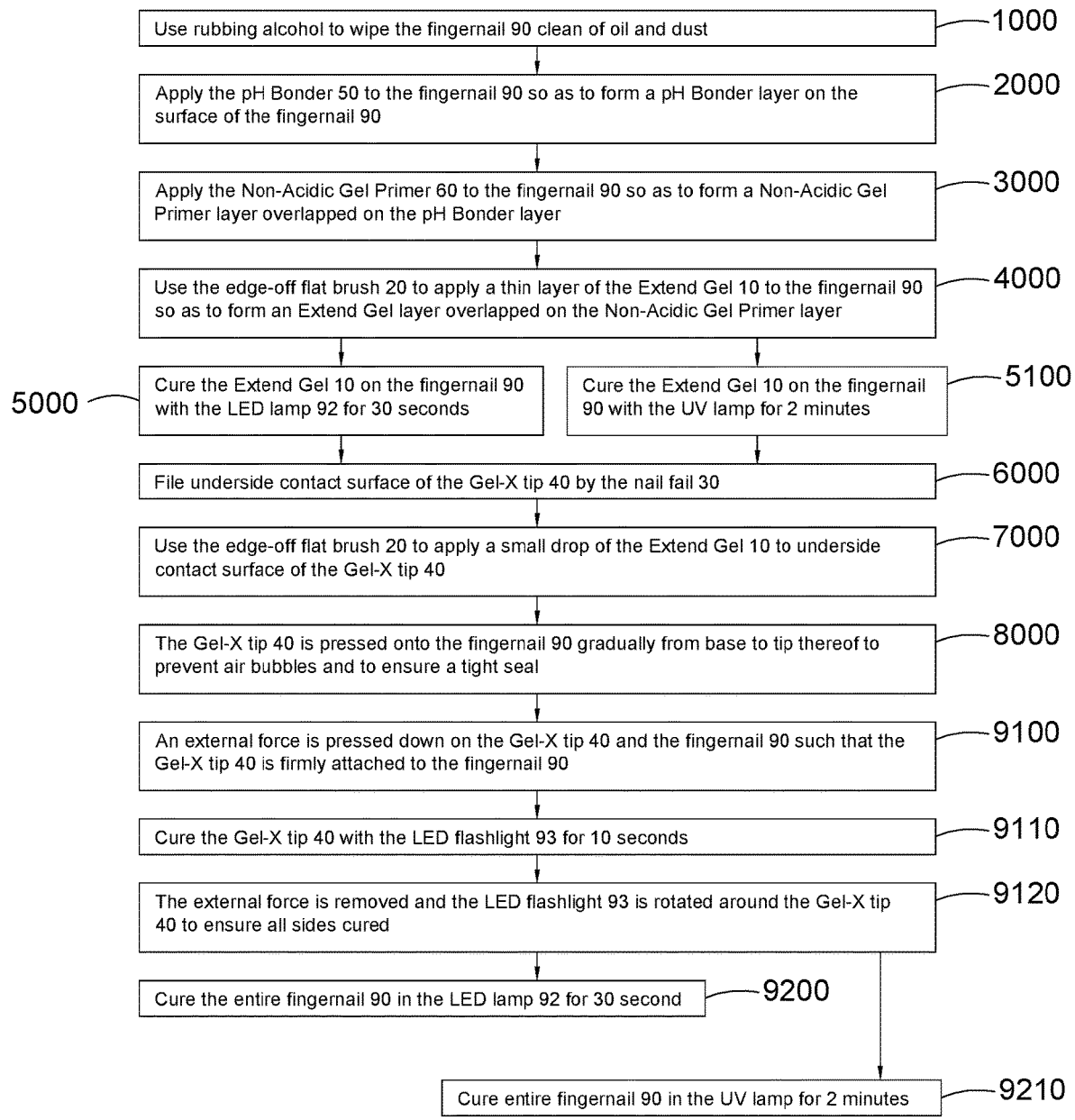
FIG. 14 is a flow diagram of the applying method of the artificial nail tip and curing composition set according to the above preferred embodiment of the present invention.

Also referring to FIG. 14 of the drawings, an applying method of a nail tip composition according to the above preferred embodiment comprises the following steps.

(1000) Use rubbing alcohol to wipe the fingernail 90 to clean off oil and dust on the fingernail 90.

(2000) Apply the pH Bonder 50 to the fingernail 90 so as to form a pH Bonder layer on the surface of the fingernail 90.

(3000) Apply the Non-Acidic Gel Primer 60 to the fingernail 90 so as to form a Non-Acidic Gel Primer layer overlapped on the pH Bonder layer.

(4000) Use the edge-off flat brush 20 to apply a thin layer of the Extend Gel 10 to the fingernail 90 so as to form an Extend Gel layer overlapped on the Non-Acidic Gel Primer layer.

(5000) Cure the Extend Gel 10 on the fingernail 90 with the LED lamp 92 for about 30 seconds.

(6000) File the underside contact surface 41 of the Gel-X tip 40 by the nail filing device 30 to form the rough affixing surface 411.

(7000) Use the edge-off flat brush 20 to apply a small drop of the Extend Gel 10 to at least a base portion of the rough affixing surface 411 of the underside contact surface 41 of the Gel-X tip 40 to form an Extend Gel tip layer.

(8000) The Gel-X tip 40 is pressed onto the fingernail 90 gradually from base to tip thereof to prevent air bubbles and to ensure a tight seal.

(9100) An external force is pressed down on the Gel-X tip 40 and the fingernail 90 until the Extend Gel tip layer on the rough affixing surface 411 is cured and hardened with the Extend Gel layer on the fingernail 90, such that the Gel-X tip 40 is firmly attached to the fingernail 90.

(9110) Cure the Gel-X tip 40 with the LED flashlight 93 for about 10 seconds.

(9120) The external force is removed and the LED flashlight 93 is rotated around the Gel-X tip 40 to ensure all sides cured.

(9200) Cure the entire fingernail 90 in the LED lamp 92 for 30 seconds.

It is worth mentioning that, alternatively, the step (5000) is able to be replaced by a step: (5100) Cure the Extend Gel 10 on the fingernail 90 with the UV lamp for about 2 minutes.

It is worth mentioning that alternatively, the step (9200) is able to be replaced by a step: (9210) Cure entire fingernail 90 in the UV lamp for about 2 minutes.

It is worth mentioning that in the applying method of the nail tip composition kit 100 according to the preferred embodiment of the present invention, the chemical composition of the Extend Gel 10 includes 60.0-80.0% by weight of the Polyurethane Acrylate Oligomer 11, 10.0-15.0% by weight of the 2-Hydroxyethyl methacrylate 12, 1.0-5.0% by weight of the 1-Hydroxycyclohexyl phenyl ketone 13, and 1.0-5.0% by weight of the Phenylbis(2,4,6-trimethylbenzoyl)phosphine oxide 14.

It is worth mentioning that the applying method of the nail tip composition kit 100 further comprises a step of: applying the MSDS top gel coat 70 used on the fingernail 90.

It is worth mentioning that in the applying method of the nail tip composition kit 100 according to the preferred embodiment of the present invention, the chemical composition of the MSDS top gel coat 70 includes 60.0-80.0% by weight of the Polyurethane Acrylate Oligomers 71, 10.0-15.0% by weight of the 2-Hydroxyethyl methacrylate (HEMA) 72, 1.0-5.0% by weight of the Di(Trimethylolpropane) Tetraacrylate 73, 1.0-5.0% by weight of the PETMP 74, and 0.0-1.0% by weight of the Polyether-Modified Polysiloxane 75.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of applying an artificial nail on a fingernail, comprising steps of:
    (a) forming an adhesive composition on the fingernail by applying a layer of said adhesive composition to the fingernail, wherein said adhesive composition consists of 75.0-80.0% by weight of polyurethane acrylate oligomer, 10.0-15.0% by weight of 2-hydroxyethyl methacrylate (HEMA), 1.0-5.0% by weight of 1-hydroxycyclohexyl phenyl ketone, and 1.0-5.0% by weight of phenylbis(2,4,6-trimethylbenzoyl) phosphine oxide;
    (b) pressing an artificial nail tip onto the fingernail gradually from a base to a tip thereof to prevent air bubbles and to ensure a tight seal; and
    (c) pressing down on said artificial nail tip and the fingernail by an external pressing force until said adhesive composition layer is cured and hardened on the fingernail to form a bonding layer between said artificial nail tip and the fingernail, such that the artificial nail tip is firmly affixed to the fingernail.

2. The method, as recited in claim 1, before the step (b), further comprising a step of applying said adhesive composition to a rough affixing surface provided on an underside contact surface of said artificial nail tip to form an adhesive composition tip layer on said underside contact surface of said artificial nail tip, wherein when said artificial nail tip is pressed down on the fingernail, said adhesive composition tip layer on said underside contact surface of said artificial nail tip is cured and hardened with said adhesive composition layer on the fingernail to form said bonding layer between said artificial nail tip and the fingernail.

3. The method, as recited in claim 1, wherein the step (c) further comprises a step of:

(c1) exposing the fingernail with said artificial nail tip pressed thereon under a lighting for ten seconds to two minutes.

4. The method, as recited in claim 2, wherein the step (c) further comprises a step of:
(c1) exposing the fingernail with said artificial nail tip pressed thereon under a lighting for ten seconds to two minutes.

5. The method, as recited in claim 3, wherein said lighting is selected from the group consisting of LED lighting and UV lighting.

6. The method, as recited in claim 4, wherein said lighting is selected from the group consisting of LED lighting and UV lighting.

7. The method, as recited in claim 1, wherein an underside contact surface of said artificial nail tip is a rough affixing surface for retaining said adhesive composition to form said bonding layer between said rough affixing surface of said artificial nail tip and the fingernail.

8. The method, as recited in claim 4, wherein an underside contact surface of said artificial nail tip is a rough affixing surface for retaining said adhesive composition applied thereon to form said adhesive composition tip layer.

9. The method, as recited in claim 7, before the step (b), further comprising a step of filing said underside contact surface of said artificial nail tip to form said rough affixing surface with said multiple indented grooves.

10. The method, as recited in claim 8, before the step (b), further comprising a step of filing said underside contact surface of said artificial nail tip to form said rough affixing surface with said multiple indented grooves.

11. The method, as recited in claim 3, wherein the step (c1) further comprises a step of applying said lighting to sides of said artificial nail tip.

12. The method, as recited in claim 4, wherein the step (c1) further comprises a step of applying said lighting to sides of said artificial nail tip.

13. The method, as recited in claim 8, wherein the step (c1) further comprises a step of applying said lighting to sides of said artificial nail tip.

14. The method, as recited in claim 10, wherein the step (c1) further comprises a step of applying said lighting to sides of said artificial nail tip.

15. The method, as recited in claim 1, further comprising a step of applying a top coat composition on the fingernail, wherein said top coat composition consists essentially of 35.0-50.0% by weight of polyurethane acrylate oligomer, 15.0-30.0% by weight of 2-hydroxyethyl methacrylate (HEMA), 10.0-25.0% by weight of di(trimethylolpropane) tetraacrylate, 5.0-10.0% by weight of pentaerythritol tetra (3-mercaptopropionate) (PETMP), and 0.0-1.0% by weight of a polyether-modified polysiloxane.

16. The method, as recited in claim 2, further comprising a step of applying a top coat composition on the fingernail, wherein said top coat composition consists essentially of 35.0-50.0% by weight of polyurethane acrylate oligomer, 15.0-30.0% by weight of 2-hydroxyethyl methacrylate (HEMA), 10.0-25.0% by weight of di(trimethylolpropane) tetraacrylate, 5.0-10.0% by weight of pentaerythritol tetra (3-mercaptopropionate) (PETMP), and 0.0-1.0% by weight of polyether-modified polysiloxane.

17. The method, as recited in claim 4, further comprising a step of applying a top coat composition on the fingernail, wherein said top coat composition consists essentially of 35.0-50.0% by weight of polyurethane acrylate oligomer, 15.0-30.0% by weight of 2-hydroxyethyl methacrylate (HEMA), 10.0-25.0% by weight of di(trimethylolpropane) tetraacrylate, 5.0-10.0% by weight of pentaerythritol tetra (3-mercaptopropionate) (PETMP), and 0.0-1.0% by weight of polyether-modified polysiloxane.

18. The method, as recited in claim 7, further comprising a step of applying a top coat composition on the fingernail, wherein said top coat composition consists essentially of 35.0-50.0% by weight of polyurethane acrylate oligomer, 15.0-30.0% by weight of 2-hydroxyethyl methacrylate (HEMA), 10.0-25.0% by weight of di(trimethylolpropane) tetraacrylate, 5.0-10.0% by weight of a pentaerythritol tetra (3-mercaptopropionate) (PETMP), and 0.0-1.0% by weight of polyether-modified polysiloxane.

19. The method, as recited in claim 8, further comprising a step of applying a top coat composition on the fingernail, wherein said top coat composition consists essentially of 35.0-50.0% by weight of polyurethane acrylate oligomer, 15.0-30.0% by weight of 2-hydroxyethyl methacrylate (HEMA), 10.0-25.0% by weight of di(trimethylolpropane) tetraacrylate, 5.0-10.0% by weight of pentaerythritol tetra (3-mercaptopropionate) (PETMP), and 0.0-1.0% by weight of polyether-modified polysiloxane.

20. The method, as recited in claim 10, further comprising a step of applying a top coat composition on the fingernail, wherein said top coat composition consists essentially of 35.0-50.0% by weight of polyurethane acrylate oligomer, 15.0-30.0% by weight of 2-hydroxyethyl methacrylate (HEMA), 10.0-25.0% by weight of di(trimethylolpropane) tetraacrylate, 5.0-10.0% by weight of pentaerythritol tetra (3-mercaptopropionate) (PETMP), and 0.0-1.0% by weight of polyether-modified polysiloxane.

\* \* \* \* \*